United States Patent [19]

Smith

[11] 4,010,842

[45] Mar. 8, 1977

[54] MACHINE FOR ORIENTING PEARS

[75] Inventor: Laurence H. Smith, Lafayette, Calif.

[73] Assignee: Atlas Pacific Engineering Company, Emeryville, Calif.

[22] Filed: Aug. 18, 1975

[21] Appl. No.: 605,283

Related U.S. Application Data

[60] Continuation-in-part of Ser. No. 407,468, Oct. 18, 1973, abandoned, which is a division of Ser. No. 267,017, June 28, 1972, Pat. No. 3,797,639.

[52] U.S. Cl. .............................................. 198/394
[51] Int. Cl.² ........................................ B65G 47/24
[58] Field of Search .......... 198/246, 247, 254, 267, 198/268, 278, 282, 285, 287, 288, 264; 193/2 R, 7, 32, 40

[56] References Cited

UNITED STATES PATENTS

| | | | |
|---|---|---|---|
| 2,326,504 | 8/1943 | Smith | 193/32 |
| 2,911,082 | 11/1959 | Wenzel et al. | 198/254 |
| 3,101,831 | 8/1963 | Gaddini | 198/254 |
| 3,116,819 | 1/1964 | Katz | 198/287 |

FOREIGN PATENTS OR APPLICATIONS

| | | | |
|---|---|---|---|
| 667,463 | 11/1938 | Germany | 198/268 |
| 951,337 | 3/1964 | United Kingdom | 193/32 |
| 1,256,505 | 12/1971 | United Kingdom | 193/40 |

*Primary Examiner*—Evon C. Blunk
*Assistant Examiner*—Joseph E. Valenza

[57] ABSTRACT

A pear orienting machine which includes an inclined feed chute along which pears are fed. The chute has a plurality of friction strips applied thereto near the inlet end thereof and the friction strips are small in relation to the size of the chute, whereby pears fed to the chute engage the spaced friction strips and those pears which are properly oriented continue along the chute in their proper orientation, but improperly oriented pears are caused to turn and be properly oriented by the frictional engagement thereof with the friction strips. The size and location of the strips is such that the pears are not excessively abraded by the strips and the strips thus remain effective for their intended purpose for extended periods of time, with the result that very few pears are wasted and more efficient operation of the machine is obtained.

1 Claim, 4 Drawing Figures

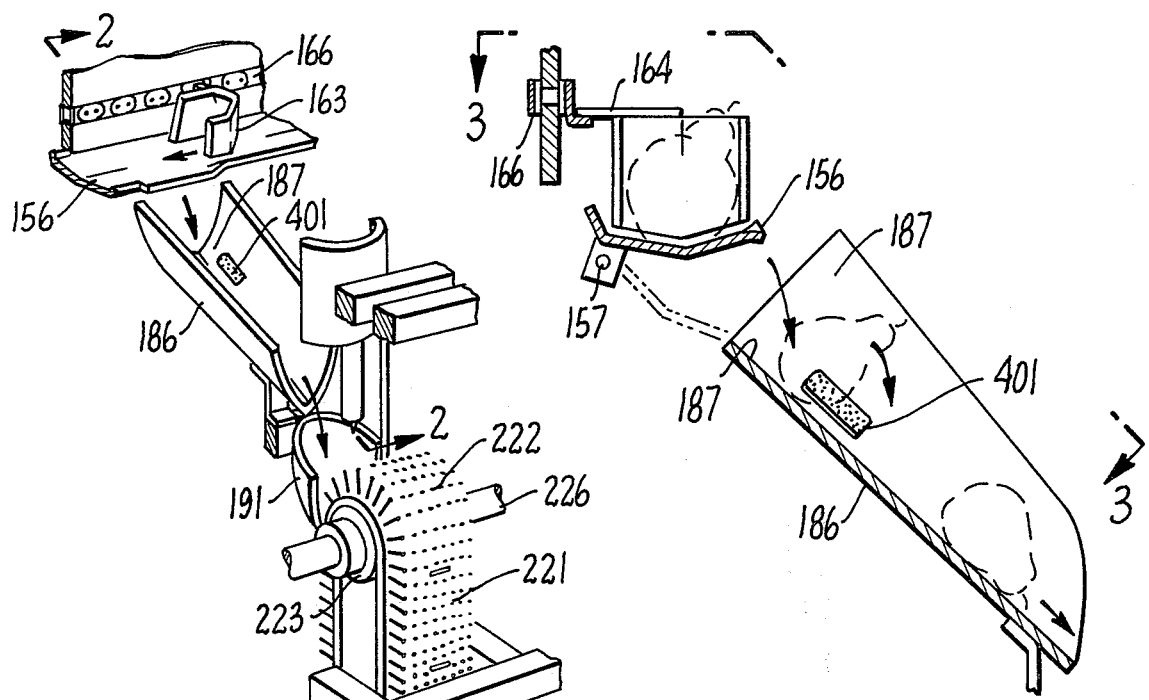
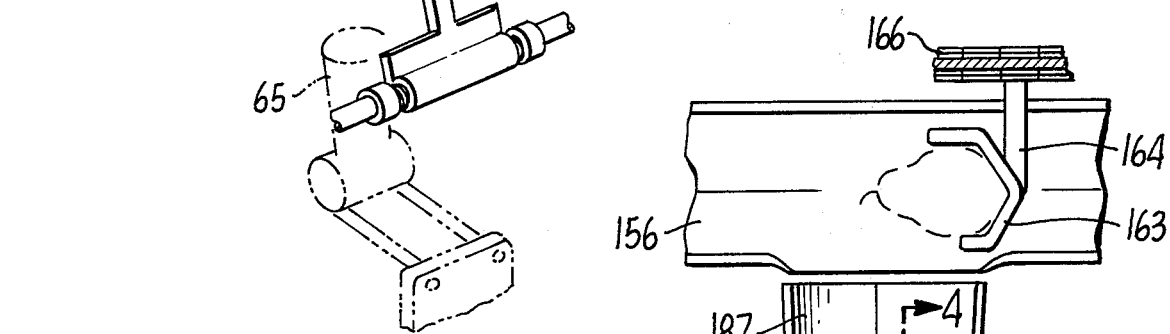
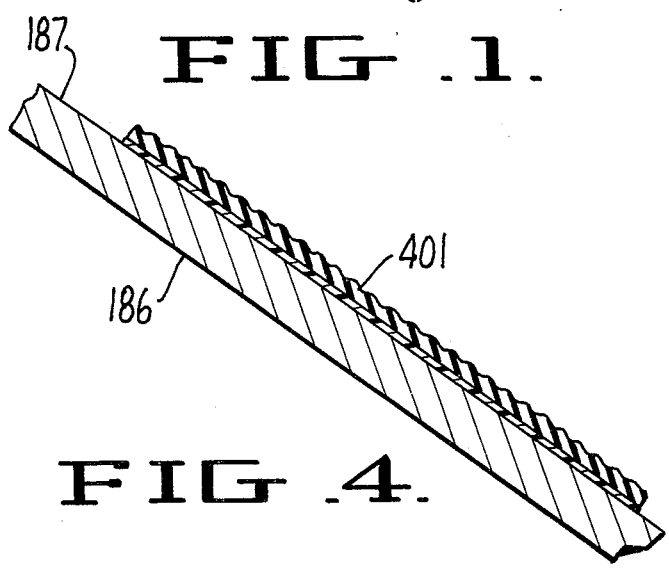
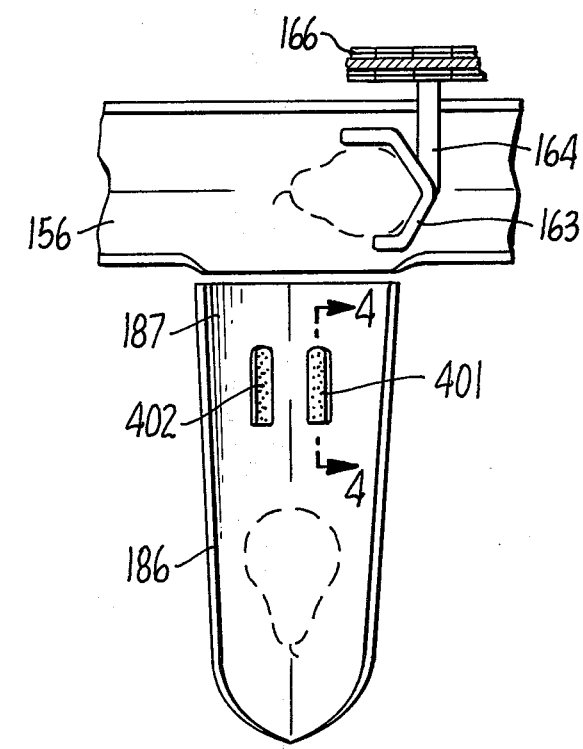

MACHINE FOR ORIENTING PEARS

This is a continuation-in-part of my prior application Ser. No. 407,468, filed Oct. 18, 1973, and now abandoned, which is in turn a division of my earlier application Ser. No. 267,017, filed June 28, 1972, now U.S. Pat. No. 3,797,639.

SUMMARY OF THE INVENTION

Heretofore pears have been fed to automatic pear peeling and coring machines by hand placement or by a machine such as shown in my prior U.S. Pat. No. 3,144,121. The placement must be such that each cup in the machine is filled with a pear. Otherwise, the output from the machine is reduced. In the automatic orientation and feeding of pears, it is desirable that the pears be of such firmness that they can be handled in the machine without any part of the pear being abraded by the machine. Thus, it is extremely troublesome when pears are fed which are in a ripe condition and are quite soft for such pears become abraded by the machine and result in the deposit on the working surface of the machine of the flesh of the pear. The end result is that the working surfaces in the machine become covered with the juice and flesh of the pear and such surfaces do not function effectively. The machine of the present invention includes feeding means which orients such ripe pears effectively, without excessive abrasion of the pears, with the result that the working surfaces remain sufficiently clean to obtain efficient operation of the machine.

It is in general the broad object of the present invention to provide an improved chute structure which ensures that irrespective of the ripeness of a pear, the pear will be fed so that when it comes to rest, its stem end is below the bulb end of the pear and in a position wherein the longitudinal axis of the pear is essentially vertical. Such improvement comprises provision of an improved structure for the chute shown at 186 in my prior U.S. Pat. No. 3,797,639.

BRIEF DESCRIPTION OF THE DRAWINGS

FIG. 1 is a perspective view of the chute and feeding mechanism of the present invention.

FIG. 2 is a section taken along the line 2—2 in FIG. 1.

FIG. 3 is a section taken along the line 3—3 in FIG. 2.

FIG. 4 is a section taken along the line 4—4 in FIG. 3.

DESCRIPTION OF THE PREFERRED EMBODIMENT

In the description of the preferred embodiment all numerals used herein refer to like parts as shown in my prior U.S. Pat. No. 3,797,639, excepting only numerals 401 and 402.

As disclosed in the aforementioned patent, pears ride along a shelf 156 under the force applied by the pusher plates 163, the pusher plates being moved by a chain 166 trained across the rear of the machine between gears, not shown. Each pusher plate is supported from an arm 164 secured on the chain 166.

The usual pear machine with which the orientor of this invention is associated, as is shown for example in U.S. Pat. No. 3,055,408, customarily includes six stations at each of which a pear is peeled and cored. Thus, at the instant that six pears are being advanced along shelf 156 by the associated pusher plates 163, the timing of the machine is such that at the instant when six pears on the shelf are properly aligned, the shelf 156 is moved from the full line position shown in FIG. 2 to the dotted line position about the pivot 157 so that each pear rolls off the shelf and into a modified V-shaped chute generally designated at 186. The chute extends downward at an angle of about 35°. The chute is made of aluminum and its upper end 187 provides a bare metal surface for engagement with the pear.

In accordance with this invention, opposite parallel strips 401 and 402 are provided in spaced relation at the upper end of the chute. These strips are made of a material which has an abrasive upper surface such that if a pear engages the strips in a position in which the bulb end is leading the stem end, the pear will be caused to turn about its bulb end into a position in which the stem end points downwardly as appears in FIG. 2. Thus, the pear slides in a stem end forward position into the remainder of the machine wherein the final orientation is effected. This means includes an inverted conical concave back piece 191 which serves to direct the pear onwardly into further orientation mechanism which includes the belt 221 having a plurality of outwardly extending fingers 222 thereon. The belt is trained about opposite rollers of which only the upper roller 223 is shown provided on shaft 226. The effect of the fingers rubbing on the pear is to cause the pear to remain with the stem end down to pass onwardly to be fed into a conical transfer cup designated at 204 in the aforementioned prior U.S. Pat. No. 3,797,639. This is effected by the cup 204 being lowered from a raised position to one wherein it deposits the pear in cup 65 for feeding into the machine. To ensure that the pear is securely positioned in the cup 65, finger 272 is rocked counterclockwise as appears in FIG. 1 to force the pear into position in the cup 65 as more fully disclosed in the aforementioned U.S. Pat. No. 3,797,639.

I claim:

1. In a pear feeding and orienting apparatus, a chute having an upper end and a lower end and having a cross-section with a curved base portion whose radius of curvature is substantially larger than the radius of curvature of the bulb portion of the largest pear to be handled and with upwardly projecting side portions spaced apart a distance at least as great as the length of the largest pear to be handled, said chute being disposed longitudinally at a predetermined downward inclination, the improvement comprising at least two strips of small size in relation to the size of the chute and secured on the chute adjacent the upper end thereof and extending along the run of the chute spaced apart on either side of the central axis of the chute, said strips extending over a small portion only of the chute and each strip having a continuous surface of a predetermined frictional coefficient greater than that of the chute such that a pear aligned lengthwise with said chute and with its stem end in leading disposition will slide along said chute in such position, but a pear with its blossom end in leading disposition will engage the spaced strips and be caused to roll over into stem end leading disposition, and means for feeding pears in spaced relationship through said chute.

* * * * *